US009201540B2

(12) United States Patent
Lee

(10) Patent No.: US 9,201,540 B2
(45) Date of Patent: Dec. 1, 2015

(54) CHARGE RECYCLING SYSTEM AND METHOD

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 856 days.

(21) Appl. No.: 13/227,224

(22) Filed: Sep. 7, 2011

(65) Prior Publication Data

US 2013/0057481 A1   Mar. 7, 2013

(51) Int. Cl.
*G06F 3/041* (2006.01)
*G06F 3/044* (2006.01)
*G09G 3/36* (2006.01)

(52) U.S. Cl.
CPC .............. *G06F 3/0416* (2013.01); *G06F 3/044* (2013.01); *G06F 3/0412* (2013.01); *G09G 3/3696* (2013.01); *G09G 2310/08* (2013.01); *G09G 2330/023* (2013.01)

(58) Field of Classification Search
CPC ..... G09G 1/005; G09G 2330/02; G09G 3/36; G09G 5/00; G06F 3/041; G05F 1/10
USPC ................ 345/87–107, 211–213; 315/59–60; 327/535–537
See application file for complete search history.

(56) References Cited

U.S. PATENT DOCUMENTS

| 6,124,840 | A  | * | 9/2000  | Kwon ............................ 345/100 |
| 7,486,108 | B2 |   | 2/2009  | Kim et al. |
| 7,567,372 | B2 |   | 7/2009  | Schorpp |
| 7,808,301 | B2 |   | 10/2010 | Chen et al. |
| 8,159,862 | B2 | * | 4/2012  | Kim et al. ...................... 365/154 |
| 2001/0030571 | A1 | * | 10/2001 | Tsutsui et al. ................. 327/536 |
| 2002/0140661 | A1 | * | 10/2002 | Miyajima et al. ............... 345/96 |
| 2006/0187187 | A1 | * | 8/2006  | Johnson et al. ............... 345/107 |
| 2008/0309654 | A1 | * | 12/2008 | Han et al. ...................... 345/211 |
| 2009/0128540 | A1 | * | 5/2009  | Hsu ................................ 345/213 |
| 2010/0219881 | A1 |   | 9/2010  | Chen et al. |
| 2010/0265241 | A1 | * | 10/2010 | Tahata .......................... 345/212 |
| 2011/0204963 | A1 | * | 8/2011  | Kim .............................. 327/536 |
| 2012/0050217 | A1 | * | 3/2012  | Noguchi et al. ............... 345/174 |
| 2012/0127122 | A1 | * | 5/2012  | Lim .............................. 345/174 |

FOREIGN PATENT DOCUMENTS

WO   2010010505 A1   1/2010

* cited by examiner

*Primary Examiner* — Ilana Spar
*Assistant Examiner* — Paras D Karki
(74) *Attorney, Agent, or Firm* — Fletcher Yoder PC

(57) ABSTRACT

Techniques for operating a touchscreen display are disclosed herein. In one embodiment, the touchscreen display device includes power regulation circuitry that supplies a first set of voltages to a display panel using high and low supply rails during a display period. During the blanking period following the display period, the high and low supply rails may be adjusted to a second set of voltages that provide for proper operation of touch-sensitive elements in the touchscreen display. Following the end of the blanking period, a portion of charge from the low supply rail is recycled by transferring the charge from the low supply rail back to the high supply rail to bring the high and low supply rails back to the first set of voltages for the next display period.

28 Claims, 7 Drawing Sheets

CHARGE RECYCLING SYSTEM AND METHOD

BACKGROUND

The present disclosure relates generally to a technique for implementing charge recycling in a display device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Display devices are commonly used in conjunction with or as a component of an electronic device to provide visual feedback to a user. One type of display is a liquid crystal display (LCD), which typically includes rows and columns of thin-film-transistors (TFTs) arranged in an array adjacent a layer of liquid crystal material, wherein the TFTs represent image pixels. For example, the rows and columns of the TFTs may form an array, wherein the columns represent data lines (e.g., coupled to the sources of a column of TFT) and the rows represent scanning lines (e.g., coupled to the gates of a row of TFTs). The LCD may be configured to selectively modulate the amount and color of light passing through each of the pixels by a varying an electric field associated with each respective pixel to control the orientation of the liquid crystals. By controlling the amount of light that may be emitted from each pixel, the LCD, in conjunction with a color filter array, may cause a viewable color image to be displayed. For instance, to render a complete image frame, image data may be loaded via into pixels on a row-by-row basis under the control of display driver circuitry.

Further, the use of touch-sensing technologies in conjunction with display devices is also becoming increasing popular. For instance, a touch-sensitive mechanism may be integrated with a display and may enable a user to interact direct with the device by physically touching graphical elements displayed on the display, such as via the user's finger(s) or using another object, such as a stylus. Thus, the use of these types of displays, often referred to as a "touchscreen," provides an input mechanism that may be more convenient than using other types of input devices, such as a keyboard and/or mouse. Accordingly, electronic devices with touchscreen displays have become increasingly popular, such as with the case of mobile devices (e.g., cellular phones, personal digital assistants (PDAs)), tablet computing devices, and even some laptop and desktop computing devices.

In some electronic devices with touchscreen displays, touch-sensing circuitry may be configured to sense for touch inputs during a blanking period that occurs between each image frame (e.g., a display period). Additionally, certain types of touchscreen displays may operate using supply voltages during the blanking period that are different than the supply voltages provided during the display period to provide for improved operation of the touch-sensing circuitry. In some conventional touchscreen displays, this is accomplished by discharging a positive supply rail to a lower voltage during the blanking period followed by using the power source powering the electronic device to charge the supply rail back to a higher voltage for the start of the next frame. However, in the case of portable electronic devices that operate primarily on limited battery power, this may increase power consumption of the touchscreen display, which may undesirably reduce battery life of the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described below relate generally to techniques for operating a touchscreen display device in a manner that reduces overall power consumption. For instance, in certain embodiments discussed below, a touchscreen display device may include power regulation circuitry that supplies a first set of voltages to a display panel using high and low supply rails during a display period (e.g., when a frame of image data is rendered on the display panel). The first set of voltages may include a positive and a negative voltage that provide for proper operation of the display panel during the display period. Next, during the blanking period following the display period, the high and low supply rails may be adjusted to a second set of voltages that provide for proper operation of touch-sensitive elements in the touchscreen display. Following the end of the blanking period, some charge from the low supply rail is recycled by transferring the charge from the low supply rail back to the high supply rail to bring the high and low supply rails back to the first set of voltages for the next display period. In comparison to certain conventional display devices, which may rely mostly on a power source (e.g., battery) to bring the high and low supply rails back to the first set of voltages, these charge recycling techniques may reduce the overall power consumption of the touchscreen display device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
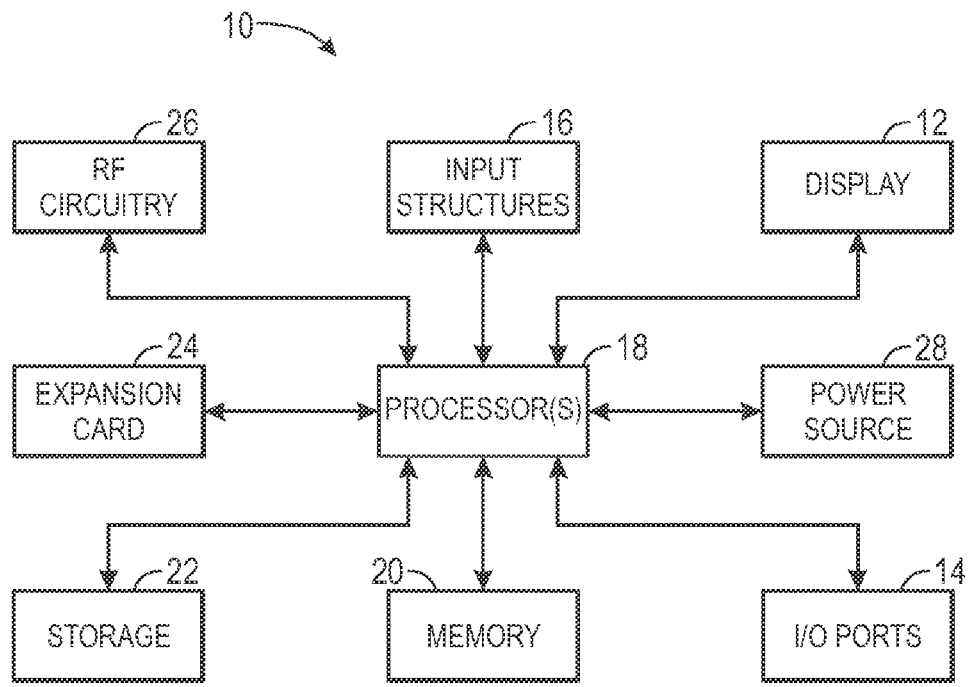
FIG. 1 is a simplified block diagram depicting components of an example of an electronic device having a display device that includes charge recycling circuitry for reducing power consumption of the display, in accordance with certain aspects set forth in the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The embodiments discussed below are intended to be examples that are illustrative in nature and should not be construed to mean that the specific embodiments described herein are necessarily preferential in nature. Additionally, it should be understood that references to "one embodiment," "an embodiment," "some embodiments," and the like are not intended to be interpreted as excluding the existence of additional embodiments that also incorporate the disclosed features.

The present disclosure relates generally to techniques for operating a display device that includes a touch-sensing circuit. As discussed above, these types of displays are commonly referred to as "touchscreens," and generally provide a convenient and easy-to-use input structure in which a user may interact with a device simply by touching the display (e.g., either by using a finger or another object, i.e., a stylus). In accordance with embodiments of the present disclosure, a display device may include power regulation circuitry that supplies a first set of voltages via high and low supply rails to the display panel during a display period in which a frame of image data is rendered on the pixels of the display panel. During the blanking period following the display period, the high and low supply rails may be adjusted to a second set of voltages that provide for proper operation of touch-sensitive elements in the display panel and touch-sensing circuitry controlling the touch-sensitive elements. At the end of the blanking period, some charge from the low supply rail is recycled by transferring the charge from the low supply rail back to the high supply rail to bring the high and low supply rails back to the first set of voltages for the next display period. Thus, compared to certain conventional display devices, which may rely mostly on a power source (e.g., battery) to bring the high and low supply rails back to the first set of voltages, the charge recycling techniques disclosed herein may reduce the overall power consumption of the display device, which may be particularly beneficial in the case of portable electronic devices.

With the foregoing points in mind, FIG. 1 is a block diagram illustrating an example of an electronic device 10 that may include a display 12 having power regulating circuitry, in accordance with aspects of the present disclosure. As discussed in further detail below, such power regulating circuitry may include charge pump circuitry configured to implement a charge recycling technique that may reduce the overall power consumption of the display 12. The electronic device 10 may be any type of electronic device, such as a laptop or desktop computer, a mobile phone, a digital media player, or the like, that includes the display 12. The various functional blocks depicted in FIG. 1 may include hardware elements, such as circuitry, software elements, such as computer code stored on computer-readable media (e.g., a hard drive, system memory, etc.), or a combination of both hardware and software elements. It should be noted that FIG. 1 is merely one example of a particular implementation and is intended to illustrate the types of components that may be present in the electronic device 10. For example, in the illustrated embodiment, these components may include the display 12 referenced above, as well as input/output (I/O) ports 14, input structures 16, one or more processors 18, memory device(s) 20, non-volatile storage 22, expansion card(s) 24, RF circuitry 26, and power source 28.

The display 12 may be used to display various images generated by the electronic device 10. In the illustrated embodiment, the display 12 may be a liquid crystal display (LCD), such as an LCD that employs fringe-field switching (FFS), in-plane switching (IPS) or other techniques use in operating such LCD devices. The display 12 may be a color display utilizing a plurality of color channels for generating color images. For instance, the display 12 may utilize a red, green, and blue color channel. Further, in other embodiments, the display 12 may also be a display that uses plasma or organic light emitting diode (OLED) technologies. Moreover, in some embodiments, the display 12 may be a touch-screen display having a touch-sensitive element controlled by touch-sensing circuitry. Thus, in such embodiments, the touch-sensitive elements may function as one of the input structures 16 for the electronic device 10. For instance, the touchscreen may sense inputs based on contact with a user's finger or with a stylus. As discussed in further detail below, such a touchscreen display may, in accordance with embodiments of the present disclosure, include charge pump circuitry configured to implement a charge recycling process to reduce the overall power consumption of the display 12. By way of example only, the display 12 may be a model of a Retina Display® available from Apple Inc. of Cupertino, Calif., which may have a pixel density of approximately 300 or more pixels per inch.

The processor(s) 18 may control the general operation of the device 10. For instance, the processor(s) 18 may provide the processing capability to execute an operating system, programs, user and application interfaces, and any other functions of the device 10. The processor(s) 18 may include one or more microprocessors, such as one or more general-purpose microprocessors, application-specific microprocessors (ASICs), or a combination of such processing components. For example, the processor(s) 18 may include one or more processors based upon x86 or RISC instruction set architectures, as well as dedicated graphics processors (GPU), image signal processors, video processors, audio processors and/or related chip sets. By way of example only, the processor(s) 18 may include a model of a system-on-a-chip (SOC) processor available from Apple Inc., such as a model of the A4 or A5 processor.

The instructions or data to be processed by the processor(s) 18 may be stored in a computer-readable medium, such as a memory device 20, which may include volatile memory, such as random access memory (RAM), non-volatile memory, such as read-only memory (ROM), or as a combination of RAM and ROM devices. The memory 20 may store a variety of information and may be used for various purposes. For example, the memory 18 may store firmware for the device 10, such as a basic input/output system (BIOS), an operating system, various programs, applications, or any other routines that may be executed on the device 10, including user interface functions, processor functions, and so forth.

The device 10 may further include a non-volatile storage 22 for persistent storage of data and/or instructions. The non-volatile storage 22 may include flash memory, a hard drive, or any other optical, magnetic, and/or solid-state storage media, or some combination thereof. Thus, although depicted as a single device in FIG. 1 for simplicity, the non-volatile storage 22 may include a combination of one or more of the above-listed storage devices operating in conjunction with the processor(s) 18. The non-volatile storage 22 may be used to store firmware, data files, image data, software programs and applications, and any other suitable data. For instance, the non-volatile storage 22 may store image and/or video data that may be displayed and/or played back on the display device 12 for viewing by a user. Additionally, the RF circuitry 26 may enable the device 10 to connect to a network, such as a local area network, a wireless network (e.g., an 802.11x network or Bluetooth network), or a cellular data network (e.g., GPRS, EDGE, 3G, 4G, LTE, WiMax, etc.), and to communicate with other devices over such networks.

Figure 2:
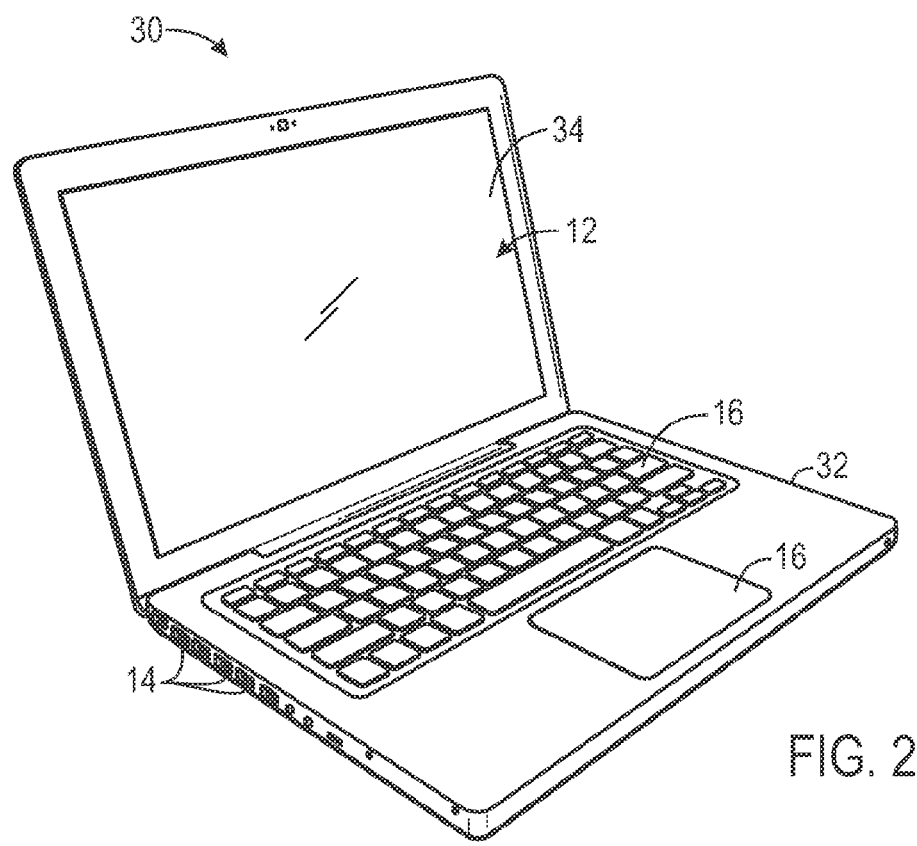
FIG. 2 shows the electronic device of FIG. 1 in the form of a computer.
Figure 3:
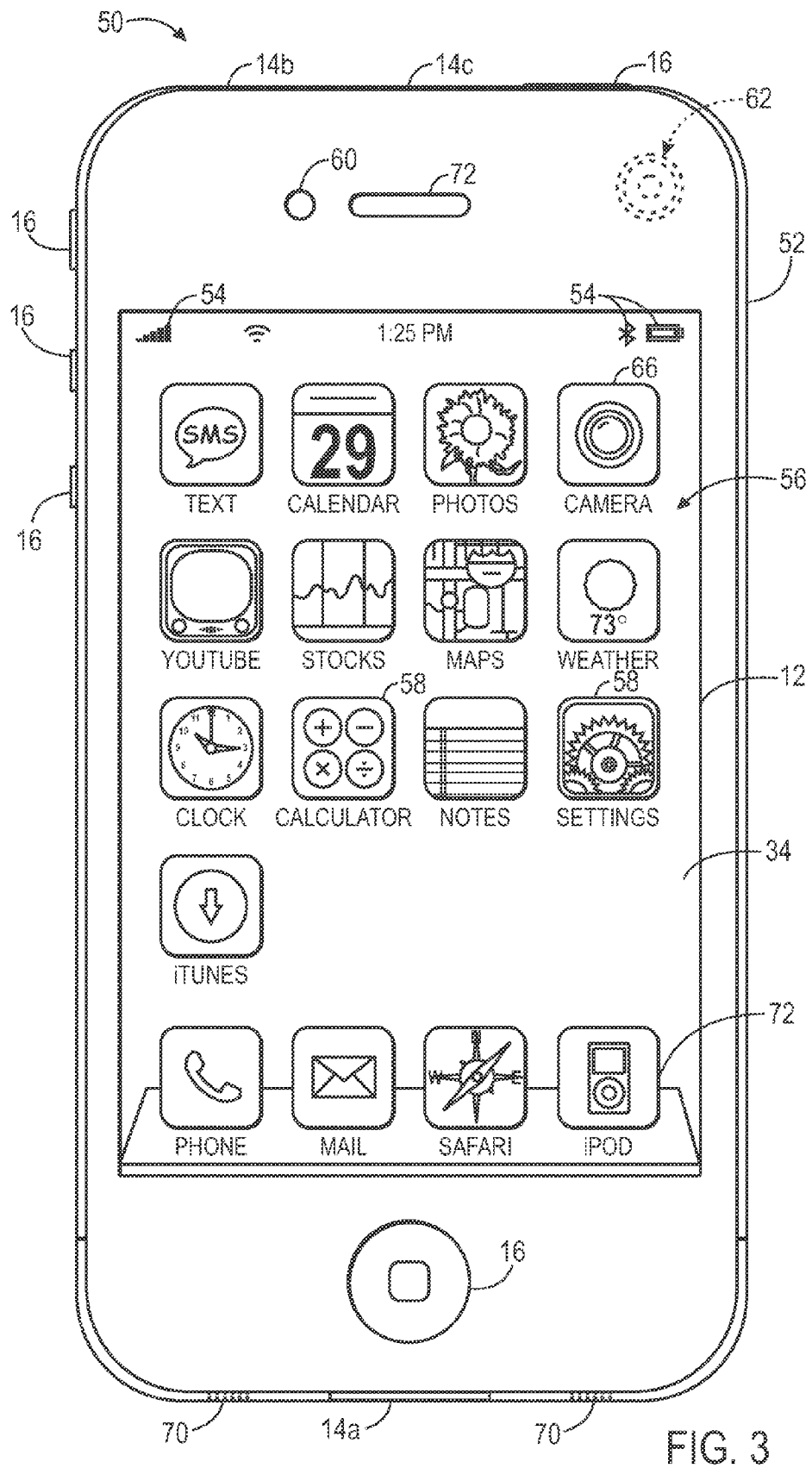
FIG. 3 shows a front view of the electronic device of FIG. 1 in the form of a handheld portable electronic device.

To provide some examples of form factors that the electronic device 10 of FIG. 1 may take, FIGS. 2 and 3 illustrate embodiments of the electronic device 10 in the form of a computer and a handheld electronic device, respectively. Referring to FIG. 2, the device 10 in the form of a computer 30 may include generally portable computers, such as laptop, notebook, tablet, and handheld computers, as well as computers generally used in one place, such as desktop computers, workstations and/or servers. The depicted computer 30 includes a housing or enclosure 32, the display 12 (e.g., as an LCD 34 or other suitable display), I/O ports 14, and input structures 16. By way of example only, embodiments of the computer 40 may include a model of a MacBook®, MacBook Pro®, MacBook Air®, iMac®, Mac Mini®, Mac Pro®, or iPad®, all available from Apple Inc.

The display 12 may be integrated with the computer 30 (e.g., the display of a laptop computer) or may be a standalone display that interfaces with the computer 30 through one of the I/O ports 14, such as via a DisplayPort, Thunderbolt, DVI, or High-Definition Multimedia Interface (HDMI) type of interface. For instance, in certain embodiments, such a standalone display 12 may be a model of an Apple Cinema Display®, available from Apple Inc. Additionally, as discussed above, the display 12 may be a touchscreen display in which touch-sensitive elements are incorporated in the display and controlled by touch-sensing circuitry to detect user inputs. As discussed in further detail below, the display 12 may include power regulating circuitry configured to reduce the overall power consumption of the display 12 via a charge recycling process.

Figure 4:
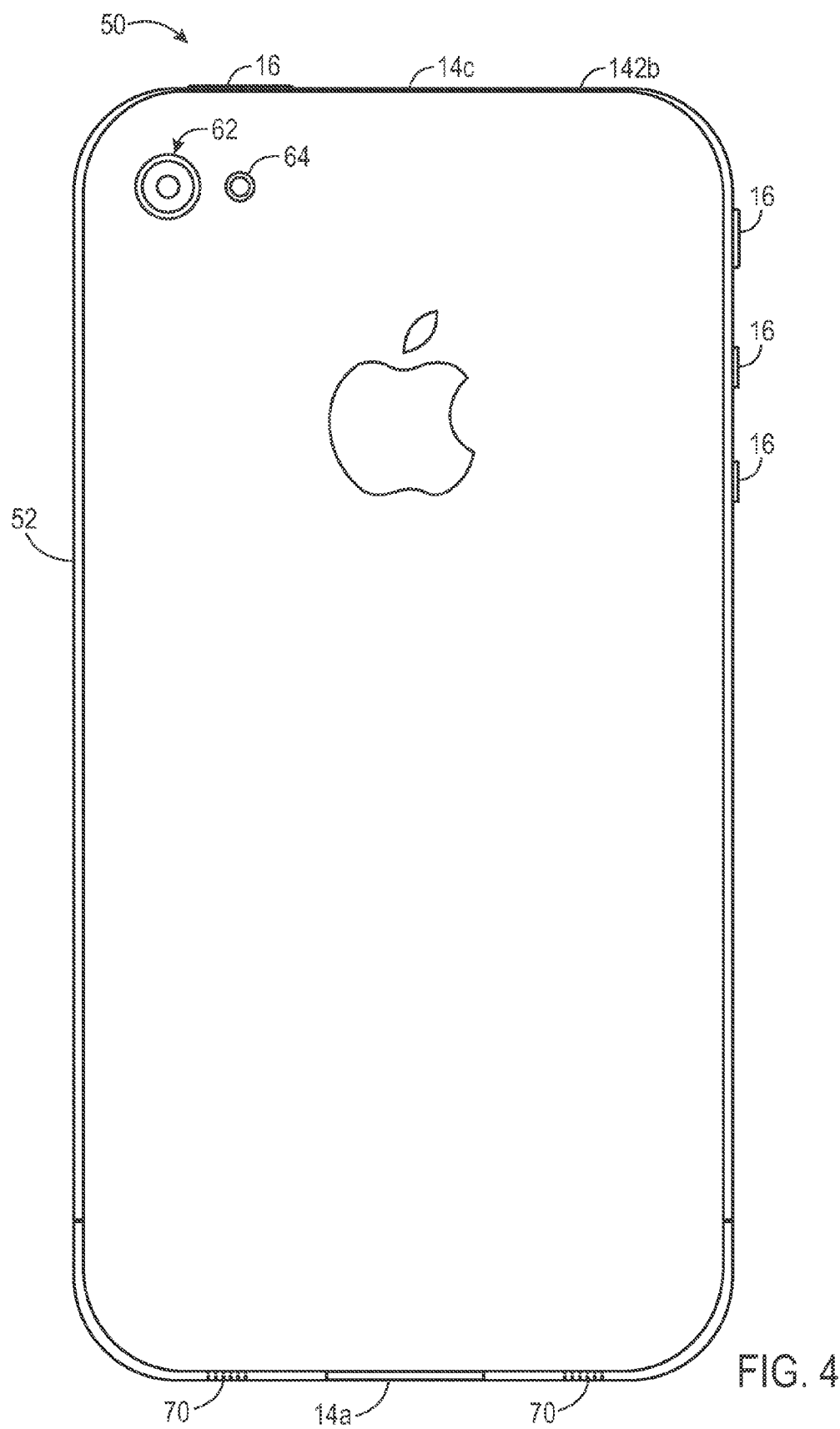
FIG. 4 shows a rear view of the handheld portable electronic device of FIG. 3.

FIGS. 3 and 4 further depict the electronic device 10 in the form of a portable handheld electronic device 50, which may include a digital media player or a cellular telephone. By way of example, the handheld device 50 may be a model of an iPod® or iPhone® available from Apple Inc. The handheld device 50 includes an enclosure 52, which may protect the interior components from physical damage and may also allow certain frequencies of electromagnetic radiation, such as wireless networking and/or telecommunication signals, to pass through to wireless communication circuitry (e.g., RF circuitry 26), which may be disposed within the enclosure 52. As shown, the enclosure 52 also includes various user input structures 16 through which a user may interface with the handheld device 50. For instance, each input structure 14 may be configured to control one or more device functions when pressed or actuated. Further, the display 12 of the device 50 may be a touchscreen display in which the touch-sensitive elements of the display 12 function as an input structure 16.

The device 50 also includes various I/O ports 14, depicted in FIG. 3 as a connection port 14a (e.g., a 30-pin dock-connector from Apple Inc.) for transmitting and receiving data and/or for charging a power source 28, which may include one or more removable, rechargeable, and/or replaceable batteries. The I/O ports 14 may also include an audio connection port 14b for connecting the device 50 to an audio output device (e.g., headphones or speakers). Further, in embodiments where the handheld device 50 provides mobile phone functionality, the I/O port 14c may be provided for receiving a subscriber identity module (SIM) card (e.g., an expansion card 24).

The display 12, which may include the LCD panel 34, may display various images generated by the handheld device 50. For example, the display 12 may display system indicators 54 providing feedback to a user regarding one or more states of handheld device 50, such as power status, signal strength, and so forth. The display 12 may also display a graphical user interface (GUI) 56 that allows a user to interact with the device 50. In the presently illustrated embodiment, the displayed screen image of the GUI 56 may represent a home-screen of an operating system running on the device 50, which may be a version of the Mac OS® or iOS® operating systems, both available from Apple Inc. The GUI 56 may include various graphical elements, such as icons 58, corresponding to various applications that may be executed upon user selection (e.g., receiving a user input corresponding to the selection of a particular icon 58. For example, in the case of a touchscreen display, a user may select an icon 58 to execute an application by touching the location of the icon 58 on the display 12.

The handheld device 50 additionally includes a front-facing camera 60 and a rear-facing camera 62 (shown in FIG. 4). In certain embodiments, one or more of the cameras 60 or 62 may be used in conjunction with a camera application 66 to acquire images for storage and viewing on the device 50. The rear side of the device 50 may also include flash module 64 (sometimes referred to as a strobe), such as an LED, for illuminating an image scene captured using the camera 62, i.e., in low lighting conditions. The front and rear facing cameras 60 and 62 may also be utilized to provide video-conferencing capabilities using a video-conferencing application, such as FaceTime®, available from Apple Inc. Additionally, the handheld device 50 may include various audio input and output elements 70 and 72. In embodiments where the handheld device 50 includes mobile phone functionality, the audio input/output elements 70 and 72 may collectively function as the audio receiving and transmitting elements of a telephone.

Figure 5:
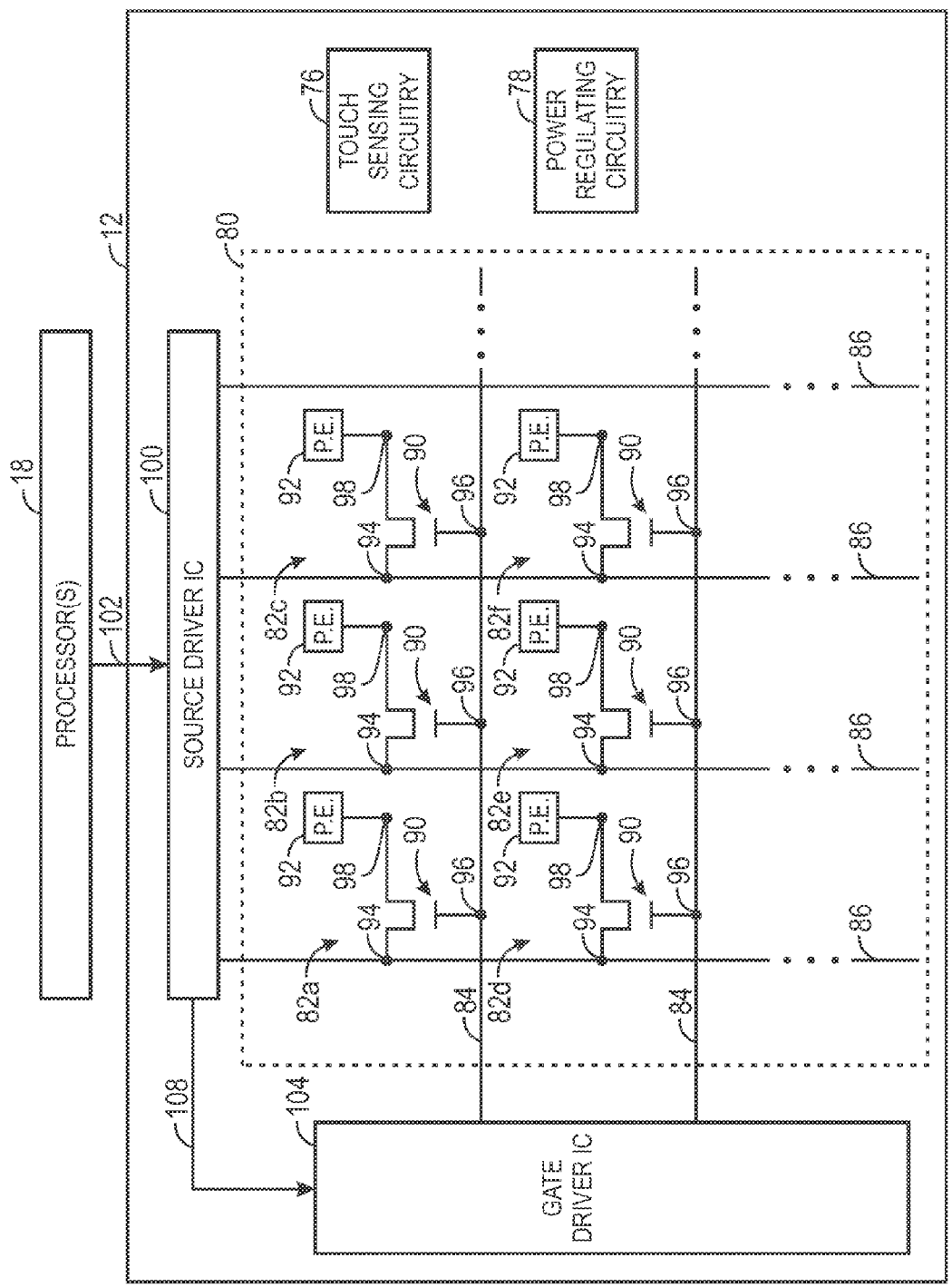
FIG. 5 is a circuit diagram illustrating a portion of an array of unit pixels of the display device of FIG. 1 that may be controlled to store image data using source driving circuitry and gate driving circuitry, in accordance with certain aspects of the present disclosure.

Having discussed the examples of the types of components that may be present in the electronic device 10 of FIG. 1, as well as the various form factors the device 10 may take, additional details of the display 12 may be better understood through reference to FIG. 5, which shows a circuit diagram of the display 12, in accordance with an embodiment. As shown, the display 12 may include a display panel 80, such as a liquid crystal display panel, as well as touch-sensing circuitry 76 and power regulating circuitry 78. The display panel 80 may include multiple unit pixels 82 arranged as an array or matrix defining multiple rows and columns of unit pixels 82 that collectively form an image viewable region of the display 12. In such an array, each unit pixel 82 may be defined by the intersection of rows and columns, represented here by the illustrated gate lines 84 (also referred to as "scanning lines") and source lines 86 (also referred to as "data lines"), respectively.

Although only six unit pixels, referred to individually by the reference numbers 82a-82f, respectively, are shown for purposes of simplicity, it should be understood that in an actual implementation, each source line 86 and gate line 84 may include hundreds or even thousands of such unit pixels 82. By way of example, in a color display panel 80 having a display resolution of 1024×768, each source line 86, which may define a column of the pixel array, may include 768 unit pixels, while each gate line 84, which may define a row of the pixel array, may include 1024 groups of unit pixels with each group including a red, blue, and green sub-pixel, thus totaling 3072 unit pixels per gate line 84. By way of further example, the panel 80 may have a display resolution of 480×320 or, alternatively, 960×640. As will be appreciated, in the context of LCDs, the color of a particular unit pixel generally depends on a particular color filter that is disposed over a liquid crystal layer of the unit pixel. In the presently illustrated example, the group of unit pixels 82a-82c may represent a group of sub-pixels including a red pixel (82a), a blue pixel (82b), and a green pixel (82c). The group of unit pixels 82d-82f may be arranged in a similar manner.

Each unit pixel 82a-82f shown in FIG. 5 includes a thin film transistor (TFT) 90 for switching a respective pixel electrode 92. In the depicted embodiment, the source 94 of each TFT 90 may be electrically connected to a source line 86. Similarly, the gate 96 of each TFT 90 may be electrically connected to a gate line 84. Furthermore, the drain 98 of each TFT 90 may be electrically connected to a respective pixel electrode 92. Each TFT 90 serves as a switching element and may be activated and deactivated (e.g., turned on and off) for a predetermined period based upon the respective presence or absence of a gate activation signal (e.g., also referred to as a scanning signal or gate clock signal) at the gate 96 of the TFT 90. For instance, when activated, the TFT 90 may store the image signals received via a respective source line 86 as a charge in its corresponding pixel electrode 92. The image signals stored by pixel electrode 92 may be used to generate an electrical field between the respective pixel electrode 92 and a common electrode (not shown in FIG. 5), which may collectively form a liquid crystal capacitor for a given unit pixel 82. Thus, in an LCD panel 80, such an electrical field may align liquid crystals molecules within a liquid crystal layer to modulate light transmission through a region of the liquid crystal layer corresponding to the unit pixel 82. For instance, light is typically transmitted through the unit pixel 82 at an intensity corresponding to the applied voltage (e.g., from a corresponding source line 86).

The display 12 also includes a source driver integrated circuit (IC) 100, which may include a chip, such as a processor or ASIC, that is configured to control various aspects of display 12 and panel 80. For example, the source driver IC 100 may receive image data 102 from the processor(s) 18 and send corresponding image signals to the unit pixels 82 of the panel 80. The source driver IC 100 may also be coupled to a gate driver IC 104, which may be configured to provide/remove gate activation signals to activate/deactivate rows of unit pixels 82 via the gate lines 84. For instance, the source driver IC 100 may include a timing controller that determines and sends timing information, represented here as 108, to the gate driver IC 104 to facilitate activation and deactivation of individual rows of pixels 82. In other embodiments, timing information may be provided to the gate driver IC 104 in some other manner (e.g., using a timing controller that is separate from the source driver IC 100). Further, while FIG. 5 depicts only a single source driver IC 100, it should be appreciated that additional embodiments may utilize multiple source driver ICs 100 in providing image signals to the pixels 82 of the panel 80. For example, additional embodiments may include multiple source driver ICs 100 disposed along one or more edges of the panel 80, wherein each source driver IC 100 is configured to control a subset of the source lines 86 and/or gate lines 84.

In operation, the source driver IC 100 receives image data 102 from the processor 18 or a discrete display controller and, based on the received data, outputs signals to control the pixels 82. For instance, to display image data 102, the source driver IC 100 may adjust the voltage of the pixel electrodes 92 (abbreviated in FIG. 5 as P.E.) one row at a time. To access an individual row of pixels 82, the gate driver IC 104 may assert a gate activation signal (e.g., setting the signal to a state that switches the TFT on) to the TFTs 90 associated with the particular row of pixels 82 being addressed. This activation signal may render the TFTs 90 on the addressed row conductive, and image data 102 corresponding to the addressed row may be transmitted from source driver IC 100 to each of the unit pixels 82 within the addressed row via respective data lines 86. Thereafter, the gate driver IC 104 may deactivate the TFTs 90 in the addressed row by de-asserting the gate activation signal (e.g., setting the signal to a state that switches the TFT off), thereby impeding the pixels 82 within that row from changing state until the next time they are addressed. The above-described process may be repeated for each row of pixels 82 in the panel 80 to reproduce image data 102 as a viewable image on the display 12.

The power regulating circuitry 78 may be configured to receive charge provided by a battery (e.g., power source 28) and provide the supply voltages necessary for proper operation of the display 12. By way of example, in one embodiment, the power regulating circuitry 78 may include charge pump circuits configured to provide the supply voltages, which may include a high and a low (e.g., positive and negative) supply voltage. The touch-sensing circuitry 76 may be configured to sense for touch inputs from touch-sensitive elements integrated within the display panel 80. For instance, the touch-sensing circuitry 76 may be configured as a capacitive touchscreen, resistive touchscreen, or using any other suitable type of touchscreen technologies.

As discussed above, in one embodiment, the touch-sensing circuitry 76 may sense for touch inputs during a blanking period between consecutive image frames, and may use different supply voltages to ensure proper operation of the touch-sensitive elements controlled by the touch-sensing circuitry 76. Accordingly, the power regulating circuitry 78 may be configured to maintain the supply voltages at a first level during a display period (e.g., while a frame of image data is being rendered) and to adjust the supply voltages to a second level to ensure proper operation of the touch-sensing circuitry during the vertical blanking period between frames. This may be better understood with reference to FIG. 6, which provides a graph depicting how the supply voltages provided by the power regulation circuitry 78 may be adjusted during a blanking period is illustrated.

Figure 6:
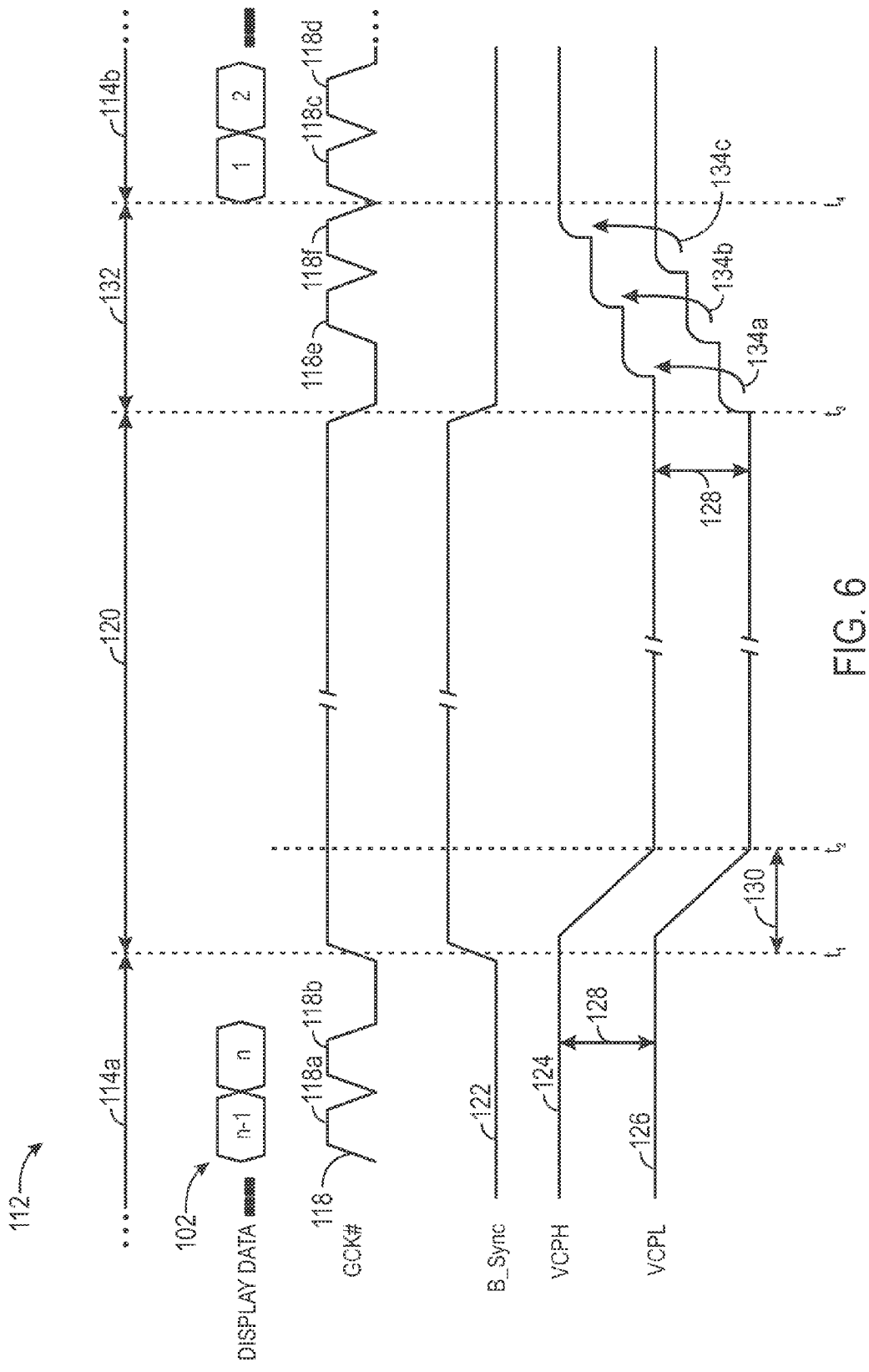
FIG. 6 is a timing diagram showing how supply voltages for the display of FIG. 5 may be adjusted during a blanking period following a display period, in accordance with certain aspects of the present disclosure.

As shown in FIG. 6, interval 114a may represent a first display period and interval 114b may represent a second display period. For instance, during the display period, image data corresponding to a first image frame may be stored into the pixels of the LCD panel 80 one row at a time, as discussed above. For instance, referring to the image data signal 102 (FIG. 5), the data segments n and n−1 may represent respective rows of image data corresponding to the last two rows of pixels in the LCD panel 80 for an image displayed during the first display period 114a. For example, referring to the gate activation signal 118 (GCK#), the pulse 118a may activate the row of image data n−1 to be stored within a corresponding row of pixels in the panel 80, whereas the pulse 118b may activate the last row of pixels of the panel 80, causing the row of image data n to be stored into the last row of pixels. Similarly, at the start of the next display period 114b, the pulse 118c may cause the row of image data 1 to be stored into the first row of pixels within the panel 80, the pulse 118d may cause the row of image data 2 to be stored into the second row of pixels within the panel, and so forth. By way of example only, if the display panel 80 were a model of a Retina Display® from Apple Inc. having a resolution of 960 rows by 640 columns of pixel groups (e.g., including respective groups of red, blue, and green sub-pixels for a total of 1920 sub-pixels per row), the image data segment n−1 may correspond to the 959th row of pixels and the image data segment n may correspond to the 960th, i.e., the last, row of pixels in the display panel 80.

The signals 124 and 126 may represent a high supply voltage (VCPH) and a low supply voltage (VCPL), respectively, that is provided to the LCD panel 80 during the display periods (e.g., 114a, 114b). For instance, in some implementations, VCPH may be a positive voltage and VCPL may be a negative voltage during the display periods. The voltage difference between VCPH and VCPL is shown in FIG. 6 by reference number 128. As discussed above, the supply voltages provided to the panel 80 may be adjusted during a blanking period following each display period. For instance, the interval 120 in FIG. 6 may represent a blanking period (from time t1 to t3) following the first display period 114a and before the second display period 114b. The start of the blanking period 120 occurs when the blanking signal (B_Sync) transitions to a logical high state (at time t1). At the start of the blanking period 120, a first transitional period 130 (from time t1 to t2) occurs in which the supply voltages VCPH (124) and VCPL (126) are each adjusted to a different level while maintaining the same voltage difference 128 within the blanking period 120. As discussed above, this may allow for proper operation of the touch-sensing circuitry 76, which may be configured to sense for touch-based inputs during the blanking period 120. To distinguish the supply voltage levels in the display periods from the adjusted supply voltage levels in the blanking period, the latter shall be referred to herein as "blanking period levels" and the former shall be referred to herein as "display period levels."

The adjusted levels (e.g., the blanking supply for the supply voltages VCPH and VCPL may be maintained until the end of the blanking period 120 (at time t3). Following the end of the blanking period, a second transitional period 132 occurs, in which the supply voltages VCPH and VCPL, which are still at the blanking period levels at the end of interval 120, are adjusted back to the display period levels. As will be discussed in further detail below, the power regulating circuitry 78 may include charge pump circuitry that is configured to provide the adjustment that occurs in period 132 using a charge recycling technique, which may reduce power consumption of the display 12, thus prolonging the battery life of the electronic device 12. As shown in embodiment of FIG. 6, the charge recycling process may occur over at least two line times (e.g., time needed to load a row of image data), as indicated by pulses 118e and 118f on the gate activation signal 118 (GCK#). Thus, by time t4, the supply voltages VCPH and VCPL are returned to the display period levels, and the next frame of image data begins to be written into the pixels of the display panel 80. In one embodiment, the display panel 80 may be configured to operate at a refresh rate of 60 Hz, meaning that 60 frames of images are displayed in one second. This translates to one frame of image data being displayed approximately every 16.67 milliseconds (ms). In such an embodiment, the display period 114 may be approximately 12 ms and the blanking period 120 may be approximately 4 ms.

Figure 7:
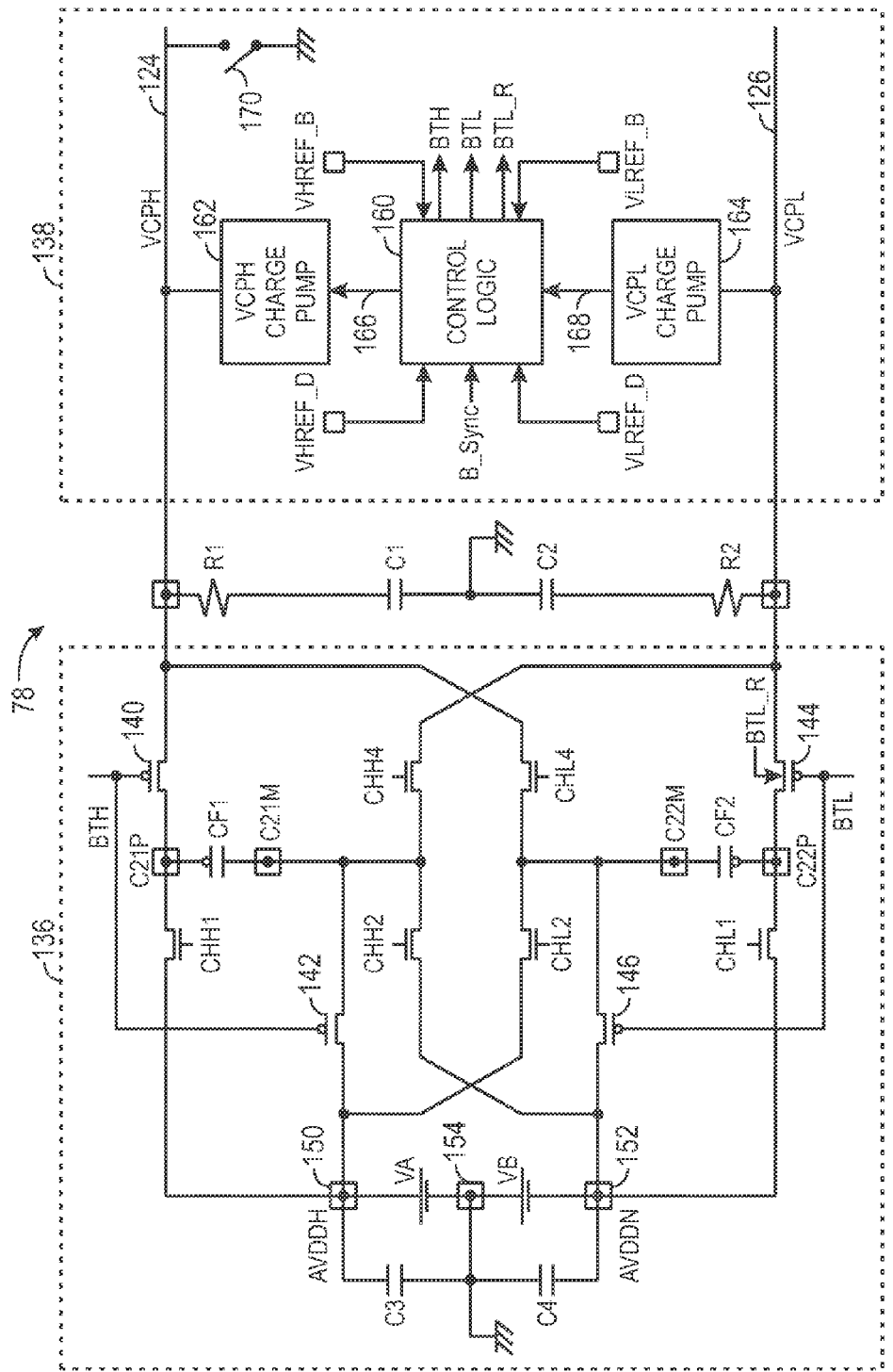
FIG. 7 is a circuit diagram illustrating power regulating circuitry that is configured to reduce power consumption of the display of FIG. 5 using a charge recycling technique, in accordance with certain aspects of the present disclosure.

Referring now to FIG. 7, circuit diagram showing an embodiment of the power regulating circuitry 78 is illustrated in accordance with aspects of the present disclosure. The power regulating circuitry 78 may include an internal charge pump circuit 136 and an external charge pump circuit 138. Resistors R1 and R2 and capacitors C1 and C2 may be electronically arranged between the internal charge pump 136 and the external charge pump 138, as shown in FIG. 7. While the power regulating circuitry 78 is shown above in FIG. 5 as being a separate component from the display driving circuitry (e.g., source driver IC 100 and gate driver IC 104), in certain embodiments, at least part of the power regulating circuitry 78 may be implemented as part of the display driving circuitry. For instance, in one embodiment, the internal charge pump 136 may be part of the display driving circuitry, while the external charge pump 138 may be implemented on a separate integrated circuit (IC). In other embodiments, both the internal and external charge pumps 136, 138 may be implemented as part of the display driving circuitry.

In the illustrated embodiment, the internal charge pump 136 may include the power supplies $V_A$ and $V_B$, which may represent batteries (e.g., part of power source 28 of FIGS. 1), and the capacitors C3, C4, CF1, and CF2, arranged as shown in FIG. 7. Particularly, the capacitors CF1 and CF2 may function as flying capacitors, as discussed in more detail below. Additionally, the internal charge pump 136 includes the switches CHH1, CHH2, CHH4, CHL1, CHL2, and CHL4, as well as switches 140, 142, 144, and 146, all of which are arranged and connected as shown in FIG. 7. The above-mentioned switches may be implemented as MOSFETS (e.g., NMOS or PMOS transistors) in one embodiment, or as any other suitable type of switching device. VCPH (124) and VCPL (126) may represent the high voltage supply rail and the low voltage supply rail, respectively, of the power regulating circuitry 78. By way of example, in the illustrated embodiment, the high supply voltage may be a positive voltage and the low supply voltage may be a negative voltage. As discussed above, VCPH and VCPL may be adjusted to different levels during the blanking period to operate the touch-sensing circuitry 76.

The external charge pump 138 may include control logic 160, as well as a first charge pump circuit 162 configured to regulate the voltage of VCPH and a second charge pump circuit 164 configured to regulate the voltage of VCPL. The control logic 160 may receive the B_Sync signal, the reference signals VHREF_D and VLREF_D, which may correspond to the desired high and low voltages for VCPH and VCPL, respectively, during the display period (e.g., period 114), and the reference signals VHREF_B and VLREF_B, which may correspond to the desired high and low voltages for VCPH and VCPL, respectively, during the blanking period (e.g., period 120). As noted above, the values for VCPH and VCPL may be different during the display period 114 and during the blanking period 120. Particularly, in some embodiments, the values for VCPH and VCPL may be reduced during the blanking period for proper operation of the touch sensing circuitry 76. Additionally, the control logic 160 may also output the control signal BTH for controlling switches 140 and 142, and the control signal BTL for controlling the switches 144 and 146. As discussed further below, the switch 144 may also be independently controlled by a second control signal BTL_R, also provided by control logic 160, during a recycling period. In other words, the switch 144 may be controlled either by BTL or BTL_R. The charge pump circuits 162 and 164 may be controlled by control signals 166 and 168, respectively, also provided by the control logic 160. Moreover, while the control logic 160 is shown in FIG. 7 as being part of the external charge pump 138, in other embodiments the control logic 160 may be separate from the external charge pump 138 (e.g., part of the internal charge pump 136 or separate from the charge pumps 136, 138 altogether).

The operation of the internal charge pump 136 and the external charge pump 138 is now described. For the display period (e.g., interval 114 of FIG. 6), the internal charge pump 136 is enabled and the external charge pump 138 is disabled. To provide the display period supply voltages, the internal charge pump 136 may operate in two periods: a charge period and a boost period. First, in the charge period, switches CHH1, CHH2, CHL1, and CHL2 may be controlled a closed state. This may connect the node C21P to the node 150 (through switch CHH1), which sees a voltage AVDDH provided by the power supply $V_A$. Additionally, the node C21M is connected to node 152 (through switch CHL2), which sees a voltage AVDDN provided by the power supply $V_B$. The configuration of the switches CHH1 and CHH2 during the charge period results in a voltage potential difference between nodes C21P and C21M of AVDDH-AVDDN, which may be stored as a corresponding charge in flying capacitor CF1. As shown in FIG. 7, the power supplies $V_A$ and $V_B$ may be center-grounded, as shown at node 154. Thus, by way of example only, if each power supply was a +6V source, the voltage difference between nodes C21P and C21M would be +12V. Further, in the illustrated embodiment, the switches CHH1, CHH2, CHL1, and CHL2 may be controlled by the control logic 160.

Also within the charge period, the closing of switches CHL1 and CHL2 may connect the node C22P to the node 152 (through switch CHL1), which sees the voltage AVDDN, and the node C22M to the node 150 (through switch CHL2), which sees the voltage AVDDH. Accordingly, the configuration of the switches CHL1 and CHL2 during the charge period results in a voltage potential difference between nodes C22P and C22M of AVDDN-AVDDH, which may be stored as a corresponding charge in flying capacitor CF2. For instance, referring to the example values above, if both power supplies were +6V sources, the voltage difference between nodes C22P and C22M would be –12V. As can be appreciated, the switches CHH1, CHH2, CHL1, and CHL2 may be controlled by respective control signals and may be closed at the same time (e.g., at the beginning of the charge period).

Following the charge period, the internal charge pump 136 may transition to a boost period, which enables VCPH and VCPL to reach the desired levels for the display period 114. In the boost period, the switches CHH1, CHH2, CHL1, and CHL2 are controlled to an open state, while a high boost signal BTH controls switches 140 and 142 to a closed state and a low boost signal BTL controls switches 144 and 146 to a closed state. As shown in FIG. 7, the control signals BTH and BTL may be provided by the control logic 160. In the illustrated embodiment, the switches 140 and 142 may be active low transistors that switch on when BTH is at a logical low state, and the switches 144 and 146 may be active high transistors that switch on when BTL is at a logical high state. Of course, other configurations are also possible for other embodiments. For instance, all of the switches 140, 142, 144, and 146 may be configured as either active low or active high transistors.

The closing of switches 140 and 142 connects the node C21P to VCPH and to capacitor C1 and connects the node C21M to node 150, which sees the voltage AVDDH from power supply $V_A$. Accordingly, the voltage level for VCPH in the boost period may be determined as the voltage at node 150 and across nodes C21P and C21M, the total of which may be expressed as (2*AVDDH-AVDDN). Similarly, the closing of switches 144 and 146 connects the node C22P to VCPL and capacitor C2 and connects the node C22M to node 152, which sees the voltage AVDDN from power supply $V_B$. Accordingly, the voltage level for VCPL in the boost period may be determined as the voltage at node 152 and across nodes C22P and C22M, the total of which may be expressed as (2*AVDDN-AVDDH). Thus, referring to the example values above where $V_A$ and $V_B$ represent +6V sources, the voltage levels of VCPH and VCPL at the end of the boost period may be approximately +18V and –18V, respectively. These supply voltage levels may be maintained for the duration of each display period 114, as depicted above in FIG. 6.

As discussed above, the supply voltages VCPH and VCPL may be adjusted to the blanking period levels during each blanking period 120, which may be indicated when the B_Sync signal 122 changes state. For instance, referring back to FIG. 6, the blanking period 120 following the display period 114a begins when B_Sync transitions to a logical high state at time t1. Thus, the control logic 160, which receives the B_Sync signal as an input, may be configured to detect when a blanking period begins (e.g., at time t1) and ends (e.g., at time t3). Once the start of a blanking period is detected, the internal charge pump 136 is disabled and the external charge pump 138 is enabled, and the supply voltages VCPH and VCPL may be adjusted from the display period levels to the blanking period levels during a transitional period 130 (e.g., from time t1 to t2), as shown in FIG. 6. Referring again to the example values above, during the transitional period 130, the positive supply rail VCPH may be discharged from the display period level (e.g., +18V) to a lower level for the blanking period 120, while the negative supply rail may be pumped down from display period level (e.g., –18V) to a lower level for the blanking period 120.

In the illustrated embodiment VCPH may be discharged by the same voltage magnitude that VCPL is pumped down, such that the supply voltages VCPH and VCPL maintain the same voltage difference 128 during the blanking period 120 as in the display period 114. By way of example only, using again the example values above, in one embodiment, VPCH may be discharged from +18V to +14V (e.g., 4 volts discharged from VCPH) and VCPL may be pumped down from –18V to –22V (e.g., –4 volts is added to VCPL). These actions may correspond to the transitional period 130 shown in FIG. 6. As discussed above, the lower supply voltage levels for the blanking period 120 may allow for improved operation of the touch-sensing circuitry 76 during the blanking period 120.

As shown in FIG. 7, the reference signals VHREF_B and VLREF_B may represent the desired voltages for VCPH and VCPL, respectively, during the blanking period 120. To discharge VCPH for the blanking period, the control logic 160 may operate the switch 170 to a closed position, which provides a discharge path to ground or any lower voltage potential. The control logic 160 may then allow VCPH to discharge while at the same time monitoring the value of VCPH. For instance, the control logic 160 may receive one or more feedback signals (not shown in FIG. 7) that may indicate the current value of VCPH. Thus, when VCPH reaches the desired voltage VHREF_B (e.g., +14V) for the blanking period 120, the control logic 120 may operate the switch 170 to an open position, which stops VCPH from further discharging. Thereafter, the charge pump circuit 162, which receives the control signal 166 from the control logic 160, may operate to maintain VCPH at the lower value (e.g., equal to VHREF_B) for the remainder of the blanking period 120 (e.g., from time t2 to t3).

Further, also within the transitional period 130, the charge pump circuit 164, which may receive the control signal 168 from the control logic 160, may be configured to pump down VCPL to a lower level corresponding to the desired voltage VLREF_B (e.g., −22V). For instance, using the example values above, if the desired voltage for VLREF_B during the blanking period is −22V, then the charge pump circuit 164 may provide additional charge (e.g., charge equivalent to −4V) to VCPL during the transitional period 130 to achieve a level equal to VLREF_B. Once the VCPL reaches VLREF_B, the charge pump circuit 164 may operate to maintain VCPL at this lower level for the remainder of the blanking period 120 (e.g., from time t2 to t3). Accordingly, during the blanking period 120, the touch sensing circuitry 76 may operate using the lower supply voltages values for VCPH and VCPL (e.g., +14V and −22V). For instance, the touch sensing circuitry 76 may sense for touch inputs, which may then be converted into input data. Depending on the sensed touch inputs, the user interface 56 of the device 10 may be updated accordingly.

The end of the blanking period 120 is indicated by a transition in the B_Sync signal (e.g., at time t3). This initiates the second transitional period 132, in which a charge recycling process is performed. During the second transitional period 132, sequential charge and recycle periods occur. For a charge period, VCPL is used a negative supply to charge the flying capacitors CF1 and CF2. For instance, at the start of the transitional period 132, the switches CHH4, CHH1, and CHL2 are controlled to a closed position. Additionally, switch 144 is controlled to a closed position by the boost signal BTL_R (e.g., noting that BTL_R is used instead of BTL, which simultaneously controls switch 146 as well). Accordingly, node C21M is connected to both VCPL and the capacitor C2 (through switch CHH4), node C21P is connected to AVDDH (through switch CHH1), node C22P is connected to VCPL and C2 (through switch 144), and node C22M is also connected to AVDDH (through switch CHL2). This causes some of the charge on VCPL and C2 to be transferred to the flying capacitors CF1 and CF2. In the illustrated embodiment, this causes the value of VCPL to increase (e.g., become less negative), as charge is removed.

Next, following a charge period, a recycle period occurs. During the recycle period, the switches CHH1, CHH4, CHL2, and 144 that were closed during the charge period are operated to an open position, and the switches 140, 142, CHL1, and CHL4 are operated from an open position to a closed position. For instance, the switches 140 and 142 may be controlled by the boost signal BTH. This causes node C21P to be connected to VCPH and C1 (through switch 140), node C21M to be connected to AVDDH (through switch CHH1), node C22P to be connected to AVDDN (through switch CHL1), and node C22M to be connected to VCPL and C1 (through switch CHL4). Accordingly, charge on the flying capacitors CF1 and CF2 (which was provided by VCPL/C2 during the charge period) is transferred to VCPH, which also causes the value of VCPH to increase. That is, charge previously on VCPL is recycled to VCPH.

As can be appreciated, the amount of charge that is transferred to the flying capacitors CF1 and CF2, and subsequently to VCPH, during each charge/recycle period may depend on the amount of time the switches CHH1, CHH4, CHL2, and 144 are closed. For instance, in the embodiment illustrated in FIG. 6, the amount of charge that is transferred from VCPL may correspond to approximately ⅓ of the voltage difference 128 between VCPH and VCPL and, therefore, three charge/recycle periods 134a-134c are illustrated. Further, in the illustrated embodiment, the charge recycling process may occur over a duration of at least two scanning line times (e.g., 118e, 118f). In other embodiments, each charge/recycle period may cause an amount of charge that is equal to approximately 1/10, ⅑, ⅛, 1/7, ⅙, ⅕, ¼, or ½ the amount of the voltage difference 128.

As discussed above, in the illustrated example, three charge/recycle periods are used to bring VCPH and VCPL back to approximately the desired values for the display period 114. This may be achieved by controlling the internal charge pump circuitry 136 via the control logic 160 while monitoring the values of VCPH and VCPL using the reference voltages VHREF_D and VLREF_D, respectively, which correspond to the desired supply voltage values for the touchscreen display 12 during the display period 114. Once VCPH and VCPL reach or get near the levels VHREF_D and VLREF_D, respectively, the internal charge pump circuitry 136 may be configured to maintain these levels for the next display period 114. In some embodiments, if VCPH and VCPL are adjusted to values that are close to but not equal to VHREF_D and VLREF_D, and wherein another charge/recycle period 134 may increase VCPH and VCPL too much, the power supplies $V_A$ and $V_B$ may be used to provide the remaining difference. Further, in additional embodiments, VCPL may also include a separate discharge path (e.g., similar to switch 170), if more charge is transferred during each charge period than the flying capacitors CF1 and CF2 are configured to store.

It should be appreciated that the example values used in describing FIG. 7 are provided by way of example only. That is, VCPH and VCPL may be configured to have other values for the display and blanking periods in other embodiments. For instance, in one embodiment, VCPH and VCPL may be configured to provide +10V and −7V, respectively, during the display period and +8V and −9V, respectively, during the display period. The values for VCPH and VCPL may, of course, depending on the voltage supplies $V_A$ and $V_B$, as well as flying capacitors CF1 and CF2.

Using the above-described charge recycling technique, most of the charge that is used to increase the levels for VCPH and VCPL from the blanking period levels back to the display period levels is provided by recycling charge from VCPL, which causes VCPL to increase as charge is removed and VCPH to increase to the removed charge from VCPL is transferred to VCPH. Accordingly, when compared to certain conventional touchscreen, in which the values for VCPH and VCPL are adjusted from the blanking period levels back to the display period levels by drawing charge directly from a power source(s), embodiments of a touchscreen display that implement the presently disclosed charge recycling techniques may provide for reduced power consumption, which may be particularly beneficial in cases where the device 10 is a portable device relying primarily on one or more batteries for power. Further, it should be noted that charge recycling, as implemented in the illustrated embodiments, allows for a quicker transition of VCPH from the blanking/touch value (VHREF_B) to the display period value (VHREF_D). This is due to the two flying capacitors CF1 and CF2 used to pump up VCPH during the transition period 132. For example, in one embodiment, both flying capacitors CF1 and CF2 may be charged to a value equal to AVDDH-VCPL, and then pumped up to a value equal to AVDDH-VCPL-ACDDN. When compared to certain conventional charge pump circuits, in which the flying capacitors CF1 and CF2 may be charged to a value equal to only AVDDH-AVDDN and pumped up to a value equal to AVDDH-(2AVDDN), the transition of VCPH from a value of VHREF_B to VHREF_D occurs faster, since VCPL is typically lower than AVDDN, thus allowing a greater amount of charge to be transferred to VCPH during each charge/recycle period 134 within period 132.

Figure 8:
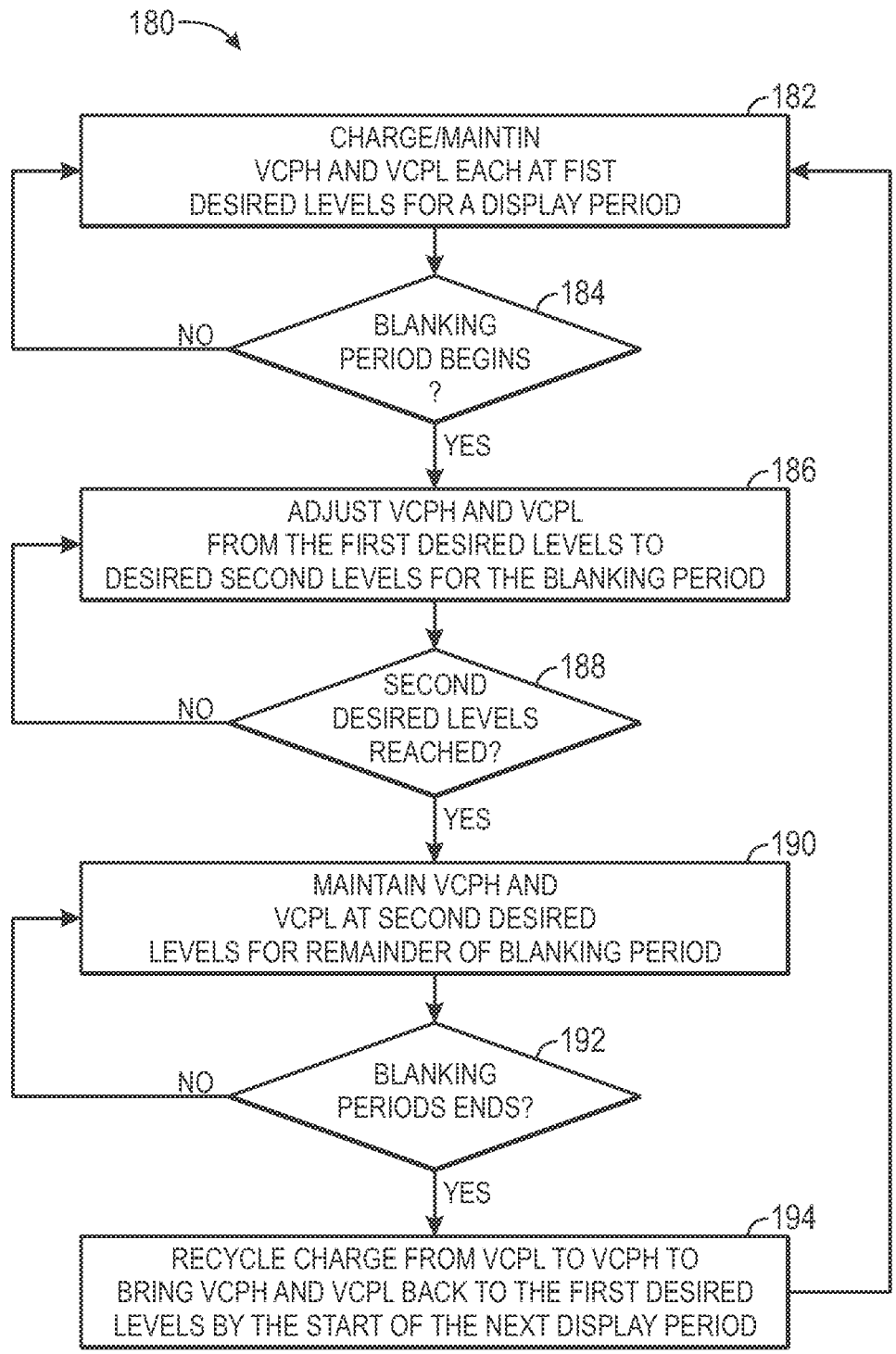
FIG. 8 is a flow chart depicting a process for operating the power regulating circuitry of FIG. 7, in accordance with certain aspects of the present disclosure.

FIG. 8 is a flow chart depicting a process 180 for operating power regulating circuitry 78 of a touchscreen display, in accordance with embodiments of the present disclosure. The process 180 begins by charging VCPH and VCPL to the desired levels (e.g., +18V and −18V, respectively) for the display period 114 (block 182). Next, decision logic 184 determines whether the blanking period 120 begins (e.g., signaling the end of the display period 114). As discussed above, this may depend on the state of a blanking signal, i.e., B_Sync. If the display period is not yet over, the process 180 returns to block 182. If it is determined that the display period has ended, the process 180 continues to block 186, and levels for VCPH and VCPL are adjusted from their respective first desired voltage levels to respective second desired voltage levels. For instance, the second desired voltage levels may be less than the first desired voltage levels, and may be selected to provide for improved or proper operation of the touch sensing circuitry 76. Here, the process 180, at decision logic 188, determines whether VCPH and VCPL have reached the desired second levels. If VCPH and VCPL have not yet reached the desired second levels, the process 180 returns to block 186 and continues to adjust the values for VCPH and VCPL. For instance, as discussed above with reference to FIG. 7, VCPH may be adjusted by discharging VCPH (using switch 170) and VCPL may be pumped down using the charge pump circuit 164.

If decision logic 188 determines that VCPH and VCPL have been adjusted to the desired second levels (e.g., +14V and −22V, respectively) for the blanking period 120, the process 180 continues to block 190, where VCPH and VCPL are maintained at their respective second levels for the remainder of the blanking period 120. Thereafter decision logic 192 determines whether the blanking period 120 ends. If the blanking period 120 is still occurring, then the process returns to block 190 and continues to maintain VCPH and VCPL at their respective desired second levels. If it is determined that the blanking period 120 ends, then the process 180 continues to block 194, and charge from VCPL is transferred via the recycling process described above to VCPH until both VCPH and VCPL are returned to the desired first levels for the next display period (e.g., 114*b*). As shown in FIG. 8, the process 180 may return to block 182 and repeat for the next display and blanking periods and so forth.

As will be understood, the various techniques described above and relating to charge recycling are provided herein by way of example only. Accordingly, it should be understood that the present disclosure should not be construed as being limited to only the examples provided above. Further, it should be appreciated that the various aspects of the charge recycling techniques disclosed herein techniques may be implemented in any suitable manner, including hardware (suitably configured circuitry), software (e.g., via a computer program including executable code stored on one or more tangible computer readable medium), or via using a combination of both hardware and software elements.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
providing a first high voltage and a first low voltage to a high power supply rail and a low power supply rail, respectively, of a power regulation device;
using the first high and low voltages to operate a display device during a display period;
at the end of the display period, detecting the start of a blanking period and providing a second high voltage and a second low voltage to the high power supply rail and the low power rail, respectively, wherein the second high voltage is less than the first high voltage and the second low voltage is less than the first low voltage;
using the second high and low voltages to operate the display device during the blanking period; and
at the end of the blanking period, recycling at least a portion of charge from the low power supply rail to the high power supply rail to reduce an amount of power consumed by the display device when transitioning from the blanking period to the display period.

2. The method of claim 1, wherein providing the first high voltage and the first low voltage to the high power supply rail and the low power supply rail, respectively, comprises using an internal charge pump of the power regulation device.

3. The method of claim 2, wherein using the internal charge pump comprises controlling a first group of switches of the internal charge pump during a charge period and a second group of switches of the internal charge pump during a subsequent boost period to provide the first high voltage and the first low voltage to the high power supply rail and the low power supply rail, respectively.

4. The method of claim 2, wherein providing the second high voltage comprises discharging the high power supply rail from the first high voltage to the second high voltage and using a first charge pump circuit of an external charge pump of the power regulation device to maintain the high power supply rail at the second high voltage during the blanking period.

5. The method of claim 2, wherein providing the second low voltage comprises using a second charge pump circuit of the external charge pump to decrease the first low voltage to the second low voltage and maintain the low power supply rail at the second low voltage during the blanking period.

6. The method of claim 2, wherein recycling at least the portion of charge from the low power supply rail to the high power supply rail comprises:
(i) controlling a third set of switches of the internal charge pump to cause the portion of charge from the low power supply rail to be transferred to at least one capacitor; and (ii) controlling a fourth set of switches of the internal charge pump to cause the portion of charge from the at least one capacitor to be transferred to the high power supply rail.

7. The method of claim 6, comprising repeating steps (i) and (ii) until the voltages of the high power supply rail and the low power supply rail are approximately equal to the first high voltage and the first low voltage, respectively.

8. The method of claim 1, wherein using the second high and low voltages to operate the display device during the blanking period comprises using the second high and low voltages to operate touch sensing circuitry of the display device.

9. A power regulation circuit comprising:
a positive supply rail and a negative supply rail configured to provide positive supply voltages and negative supply voltages, respectively, to a display device;
internal charge pump circuitry comprising a plurality of switches configured to provide a first positive voltage to the positive supply rail and a first negative voltage to the negative supply rail during a display interval;
external charge pump circuitry configured to cause the positive supply rail and the negative supply rail to be adjusted to a second positive voltage and a second negative voltage, respectively, during a blanking interval following the display interval; and
control logic configured to control the switches of the internal charge pump, wherein, following the blanking interval, the control logic is configured to control the switches to cause a portion of charge from the negative supply rail to be transferred to the positive supply rail prior to the start of a next display interval.

10. The power regulation circuit of claim 9, wherein the internal charge pump comprises:
a first capacitor arranged between a first node and a second node;
a second capacitor arranged between a third node and a fourth node;
first and second power sources arranged in series between a fifth node and a sixth node, wherein a positive terminal of the first power source is coupled to the fifth node, a negative terminal of the first power source is coupled to a grounding point, a positive terminal of the second power source is coupled to the grounding point, and a negative terminal of the second power source is coupled to the sixth node, wherein the fifth node has a positive voltage corresponding to the first power source and the sixth node has a negative voltage corresponding to the second power source;
a first switch arranged between the first node and the fifth node;
a second switch arranged between the second node and the sixth node;
a third switch arranged between the third node and the sixth node;
a fourth switch arranged between the fourth node and the fifth node;
a fifth switch configured to connect the first node to the positive supply rail and to a third capacitor when the fifth switch is in a closed position;
a sixth switch arranged between the second node and the fifth node;
a seventh switch configured to connect the third node to the negative supply rail and to a fourth capacitor when the seventh switch is in a closed position;
an eighth switch arranged between the fourth node and the sixth node;
a ninth switch arranged between the second node and the negative supply rail; and
a tenth switch arranged between the fourth node and the positive supply rail.

11. The power regulation circuit of claim 10, wherein the fifth and sixth switches are controllable using a common first control signal provided by the control logic, wherein the seventh and eighth switches are controllable using a common second control signal provided by the control logic, and wherein the eighth switch is also independently controllable using a third control signal that is separate from the second control signal.

12. The power regulation circuit of claim 10, wherein, to provide the first positive voltage to the positive supply rail and the first negative voltage to the negative supply rail during the display interval, the control logic is configured to:
during a charge period, control each of the first switch, second switch, third switch, and fourth switch to a closed position, such that the fifth node is connected to both the first node and the fourth node and the sixth node is connected to both the second node and the third node, wherein the first capacitor is charged such that the difference between the first node and the second node is equal to the difference between the positive voltage at the fifth node and the negative voltage at the sixth node, and wherein the second capacitor is charged such that the difference between the third node and the fourth node is equal to the difference between the negative voltage at the sixth node and the positive voltage at the fifth node; and
during a boost period following the charge period, control each of the first switch, second switch, third switch, and fourth switch to an open position and each of the fifth switch, sixth switch, seventh switch, and eighth switch to a closed position, such that first node is connected to the positive supply rail and the third capacitor, the second node is connected to the fifth node, the third node is connected to the negative supply rail and the fourth capacitor, and the fourth node is connected to the sixth node, and wherein the first positive voltage provided to the positive supply rail is equal to twice the positive voltage at the fifth node minus the negative voltage at the sixth node and the first negative voltage provided to the negative supply rail is equal to twice the negative voltage at the sixth node minus the positive voltage at the fifth node.

13. The power regulation circuit of claim 12, wherein, to adjust the first positive and negative voltages to the second positive and negative voltages, respectively, during the blanking interval, the control logic is configured to:
discharge the positive supply rail from the first positive voltage to the second positive voltage and, when the positive supply rail equals the second positive voltage, use a first charge pump circuit of the external charge pump to maintain the positive supply rail at the second positive voltage for the remainder of the blanking interval;
use a second charge pump circuit of the external charge pump to pump down the negative supply rail until the voltage of the negative supply rail equals the second negative voltage and to maintain the negative supply rail at the second negative voltage for the remainder of the blanking interval.

14. The power regulation circuit of claim 13, wherein the control logic is configured to cause the portion of charge from the negative supply rail to be transferred to the positive supply rail prior to the start of the next display interval by:

detecting the end of the blanking interval; and
after detecting the end of the blanking interval, controlling the switches of the internal charge pump circuitry by:
controlling each of the first switch, fourth switch, seventh switch, and ninth switch into a closed position to cause the portion of charge to be transferred to the first and second capacitors;
controlling each of the first switch, fourth switch, seventh switch, and ninth switch into an open position; and
controlling each of the third switch, fifth switch, sixth switch, and tenth switch into a closed position to cause the portion of charge stored in the first and second capacitors to be transferred to the positive supply rail.

15. A display device comprising:
a liquid crystal display panel, wherein the display panel comprises an array of display pixels and touch-sensitive elements;
touch-sensing circuitry configured to control the touch-sensitive elements;
display driver circuitry configured to a drive a frame of image data to the display pixels of the display panel during a display period of operation;
power circuitry configured to:
supply a first positive voltage and a first negative voltage to the display device during the display period using a positive supply rail and a negative supply rail, respectively;
supply a second positive voltage and a second negative voltage to the display device during a blanking period of operation following the display period;
supply the first positive voltage and the first positive voltage to the display device during another subsequent display period by transferring charge from the negative supply rail to the positive supply rail.

16. The display device of claim 15, wherein the first positive and negative voltages are used to operate the display panel during the display period and the second positive and negative voltages are used to operate the touch-sensing circuitry during the blanking period.

17. The display device of claim 15, wherein, following the blanking period, charge is transferred from the negative supply rail to the positive supply rail until the positive and negative supply rails reach at least approximately the first positive and negative voltages, respectively.

18. The display device of claim 15, wherein the second positive voltage is less than the first positive voltage, and wherein the second negative voltage is less than the first negative voltage.

19. The display device of claim 15, wherein the touch-sensing circuitry and the touch-sensitive elements are configured to provide at least one of a capacitive touchscreen display or a resistive touchscreen display.

20. An electronic device comprising:
one or more input structures;
a storage structure encoding one or more executable routines;
a processor capable of receiving inputs from the one or more input structures and of executing the one or more executable routines; and
a touchscreen display configured to display an output of the processor, wherein the display device comprises:
a liquid crystal display (LCD) panel comprising a plurality of pixels arranged in rows and columns;
touch-sensing circuitry configured to controltouch-sensitive elements that receive touch inputs from a user; and
power regulation circuitry comprising:
a high voltage supply rail and a low voltage supply rail configured to provide high supply voltages and low supply voltages, respectively, to the display panel;
internal charge pump logic configured to provide a high display period voltage to the high voltage supply rail and a low display period voltage to the low voltage supply rail when the display panel is operating in a first display period;
external charge pump logic configured to provide a high blanking period voltage to the high voltage supply rail and a low blanking period voltage to the low voltage supply rail when the display panel is operating in a blanking period following the first display period; and
control logic configured to, after the blanking period and prior to a second display period, return the high voltage supply rail and the low voltage supply rail to the high and low display period voltages, respectively, by transferring a portion of charge from the low voltage supply rail to the high voltage supply rail to reduce an amount of power consumed by the electronic device during a transition between the blanking period and the second display period.

21. The display device of claim 20, wherein the voltage difference between the high and low display period voltages is equal to the voltage difference between the high and low blanking period voltages.

22. The display device of claim 20, wherein the power regulation circuitry is part of a display driver configured to send image data to the display panel.

23. The display device of claim 20, wherein the high voltage supply rail and the low voltage supply are returned to the high and low display period voltages, respectively, in at least two line times of the display panel.

24. The electronic device of claim 20, comprising at least one of a laptop computer, a desktop computer, a portable media player, a mobile phone, a tablet computing device, or some combination thereof.

25. A method comprising:
providing a first voltage to a first supply rail and a second voltage to a second supply rail during a first time interval;
providing a third voltage to the first supply rail and a fourth voltage to the second supply rail during a second time interval subsequent to the first time interval; and
providing the first voltage to the first supply rail and the second voltage to the second supply rail during a third time interval by transferring charge from the second supply rail to the first supply rail to achieve the first and second voltages.

26. The method of claim 25, wherein providing the third voltage to the first supply rail comprises discharging the first supply rail from the first voltage to the third voltage.

27. The method of claim 26, wherein providing the fourth voltage to the second supply rail comprises using a charge pump circuit to pump the second supply rail from the second voltage to the fourth voltage.

28. The method of claim 26, wherein the first and third voltages are positive voltages and the second and fourth voltages are negative voltages.

* * * * *